(12) United States Patent
Daoud

(10) Patent No.: US 6,359,223 B1
(45) Date of Patent: Mar. 19, 2002

(54) METHOD AND APPARATUS FOR MAKING A HIGH-PRESSURE SEAL USING COLD SHRINK TUBING

(75) Inventor: Bassel Hage Daoud, Parsippany, NJ (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/372,392

(22) Filed: Aug. 11, 1999

(51) Int. Cl.$^7$ .................................................. H02G 3/18
(52) U.S. Cl. .............................. 174/65 R; 174/DIG. 8
(58) Field of Search ............................. 174/65 R, 66, 174/DIG. 8; 220/241

(56) References Cited

U.S. PATENT DOCUMENTS

| | | | |
|---|---|---|---|
| 1,751,262 A | * 3/1930 | Brown | |
| 3,515,798 A | 6/1970 | Sievert | 174/135 |
| 3,518,359 A | * 6/1970 | Trimble et al. | |
| 4,256,920 A | * 3/1981 | Ayres et al. | 174/65 R |
| 4,494,779 A | * 1/1985 | Neff et al. | 174/65 R |
| 4,616,105 A | * 10/1986 | Borsh | 174/65 R |
| 4,849,582 A | * 7/1989 | Stevenson | 174/DIG. 8 |
| 4,871,599 A | 10/1989 | Knorr | 428/36.9 |
| 4,913,522 A | 4/1990 | Nolf et al. | 350/96.2 |
| 5,091,605 A | * 2/1992 | Clifford | 174/65 R |
| 5,155,794 A | 10/1992 | Nolf et al. | 385/135 |
| 5,249,253 A | 9/1993 | Franckx et al. | 385/135 |
| 5,276,280 A | * 1/1994 | Ball | 174/65 R |
| 5,297,585 A | * 3/1994 | Andou et al. | 174/DIG. 8 |
| 5,602,954 A | 2/1997 | Nolf et al. | 385/135 |
| 5,627,343 A | * 5/1997 | Brandolf | 174/DIG. 8 |
| 5,670,223 A | 9/1997 | Sadlo et al. | 428/34.9 |
| 5,704,400 A | * 1/1998 | Eldridge | 174/65 R |
| 5,736,208 A | * 4/1998 | Wilck et al. | 174/DIG. 8 |
| 5,763,832 A | * 6/1998 | Anselm | 174/65 R |
| 5,803,292 A | 9/1998 | Daoud | 220/4.02 |
| 5,907,127 A | 5/1999 | Daoud | 174/57 |
| 6,082,782 A | * 7/2000 | Bartholoma et al. | 174/65 R |
| 6,111,198 A | * 8/2000 | Tower | 174/65 R |
| 6,114,630 A | * 9/2000 | Gretz | 174/65 R |
| 6,215,065 B1 | * 4/2001 | Cox | 174/65 R |

* cited by examiner

*Primary Examiner*—Jeffrey Sterrett
(74) *Attorney, Agent, or Firm*—Duane, Morris & Heckscher LLP

(57) ABSTRACT

An assembly has a housing with an opening. The housing may be a building entrance protector. The housing has first and second cable ports aligned with the opening and aligned with each other. The first cable port extends outwardly from the housing, and the second cable port extends into the housing. A cable passes through the first and second cable ports. The cable may contain optical fibers. A first cold shrink tubing is placed over the first cable port and a portion of the cable that extends outward from the housing. A second cold shrink tubing is placed over the second cable port and a portion of the cable that extends into the housing. The first and second cable ports may be integrally formed from a single tubular piece of material having a single mounting flange. Alternatively, the cable ports may be separate and distinct from each other, and may each have a respective mounting flange. Alternatively, the cable ports may be integrally formed as a part of the housing.

14 Claims, 6 Drawing Sheets

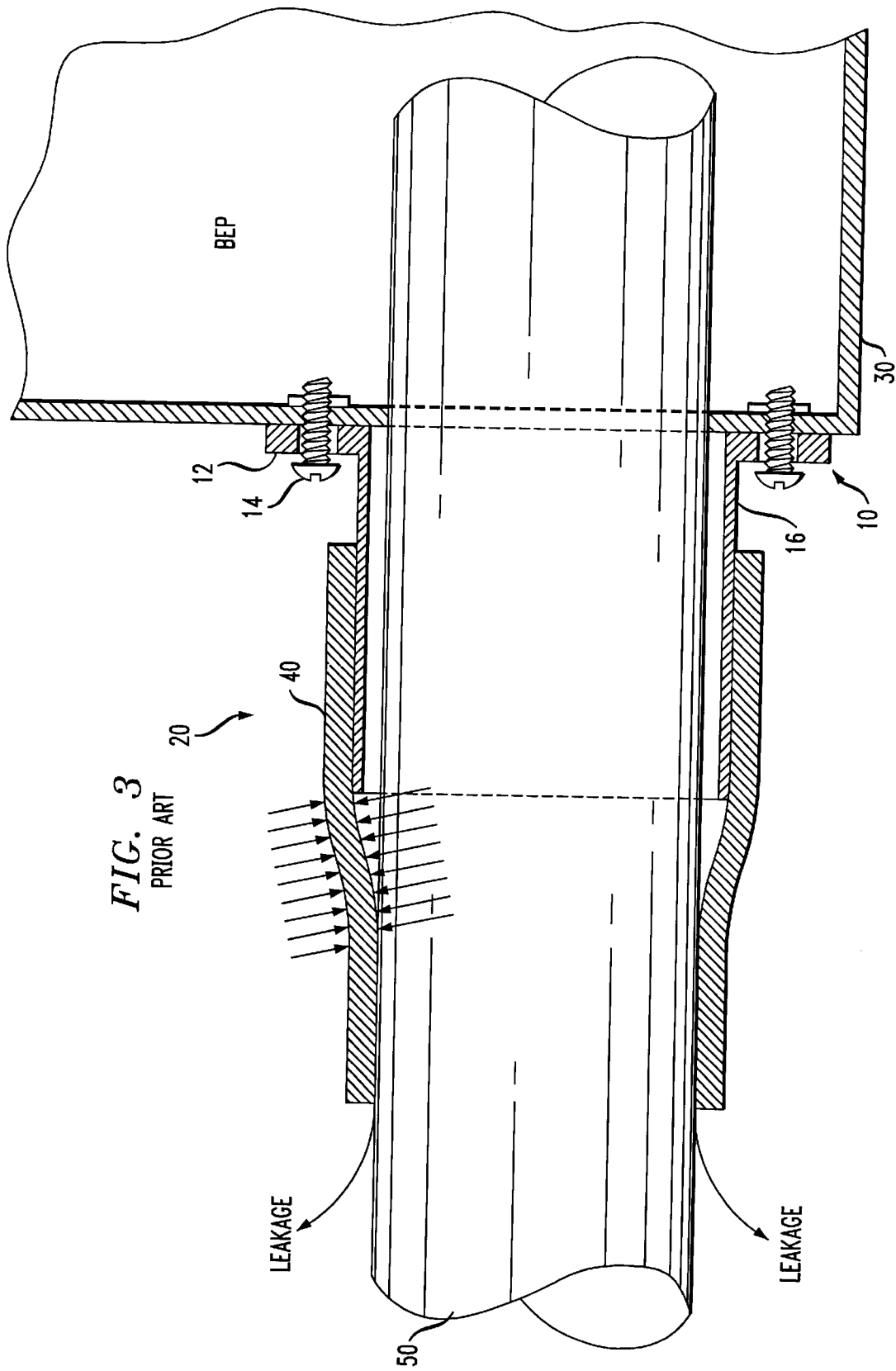

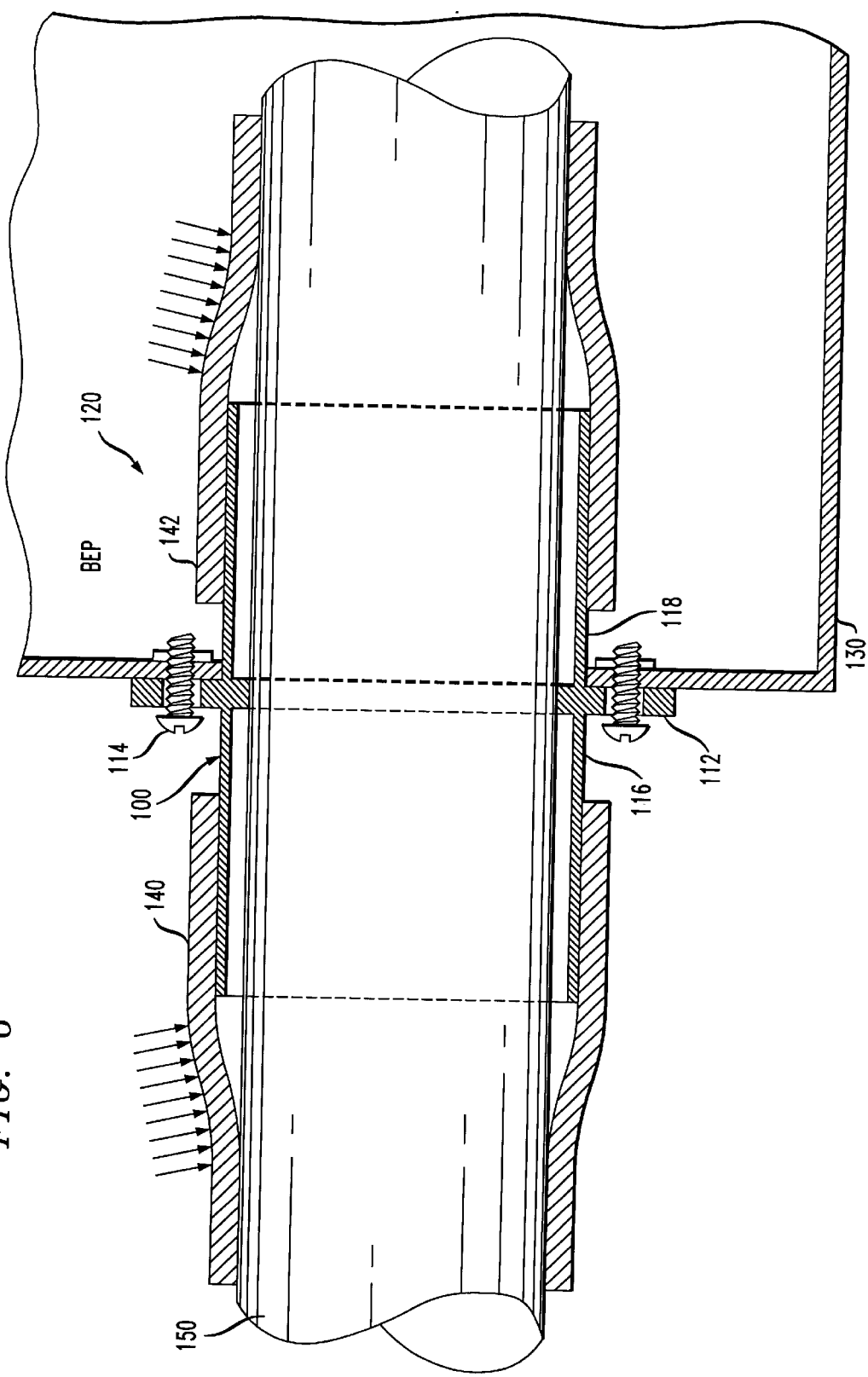

METHOD AND APPARATUS FOR MAKING A HIGH-PRESSURE SEAL USING COLD SHRINK TUBING

FIELD OF THE INVENTION

The present invention relates to telecommunications equipment generally, and specifically to methods for securing a cable to an enclosure.

DESCRIPTION OF THE RELATED ART

A building entrance protector (BEP) enclosure houses the physical interface between the nodes of a local telecommunications network and a telecommunications cable. For example, a BEP enclosure may house the interface hardware between the telephones of an office building and an exterior telephone cable having a number of twisted copper pairs that carry the voice signals for those telephones. A BEP enclosure is typically mounted in the basement or first floor of the office building. A BEP enclosure may also be used to house the interface hardware for systems based on fiber optical communications. Similarly, BEP enclosures may be used with telecommunications systems carrying signals other than just telephone voice signals.

A BEP enclosure provides two main functions: (1) it houses the hardware that provides connections between a cable and the individual nodes (e.g., telephones) of a local network; and (2) it houses the hardware that provides electrical isolation between the cable and the local network. Electrical isolation is intended to prevent any high voltages and/or high currents that may exist from time to time in the cable from reaching the local network. For example, a BEP enclosure will house isolation components designed to protect telephone users from lightning striking a telephone cable. Such electrical isolation is typically provided by 5-pin plug-in protectors that quickly connect signals to ground upon detection of sufficiently high voltages or currents. Building entrance protectors are described in U.S. Pat. No. 5,803,292 and 5,907,127, which are expressly incorporated by reference herein.

The end cap of a BEP may include one or more cable ports, which extend outwardly from the end cap. The cable port allows the cable to enter into the enclosure. If the BEP is not pressurized, cold shrink tubing is normally used to seal around both the cable and the cable port. Cold shrink tubing is described in U.S. Pat. No. 3,515,798, No. 4,871,599, and No. 5,670,223, all of which are expressly incorporated herein by reference. The cold shrink tubing secures the cable to the BEP housing, aligns the cable, and provides a seal to protect the fiber enclosure from the outdoor environments.

High pressure seals (of greater than about 7 psi) are desirable in enclosures housing optical fibers. If a high-pressure seal is required, cold shrink tubing has not provided a sufficiently air and water tight seal using conventional techniques. To ensure that a high pressure seal is achieved, it is common to inject pressurized air (between five and ten pounds per square inch) into the enclosure to test for leaks. Cold shrink tubing has not been able to provide an adequate seal under these test conditions.

FIGS. 1 and 2 show a conventional cable port 10 having a mounting flange 12, a cylindrical side wall 16 and fasteners 14. FIG. 3 shows a conventional joint 20 using the cable port 10. The cable port 10 is mounted to BEP 30. A cable 50 is secured to the cable port 10 using a cold shrink tubing 40. If the pressure outside the housing 30 is greater than inside the housing, then the outside pressure improves the sealing action of the cold shrink tubing. However, when high pressure is applied inside the BEP housing 30, leakage occurs between the cable and the cold shrink tubing. The high pressure air from the housing 30 can enter between the cable 50 and the tubing 40. Because the pressure of the air inside the tubing 40 is greater than the ambient pressure, leakage develops when the high pressure lifts the tubing away from the cable 50.

In conventional fiber optic enclosures, the cable is typically secured to the housing using a heat shrink tubing. Heat shrink tubing has an adhesive inside it. When heat is applied to the heat shrink tubing, the adhesive melts and the tubing shrinks to grip the cable and cable port.

Heat shrink tubing has several disadvantages. The heat must be applied carefully and uniformly to make the tubing shrink evenly. It takes a long time to heat-treat the heat shrink tubing, often as long as 20 minutes. An expensive heat gun is required. A source of power for the heat gun is also required, which may be inconvenient in the field.

An improved high pressure seal for connecting a cable to a housing is desired.

SUMMARY OF THE INVENTION

The present invention provides a method for connecting a cable to a housing. A housing is provided, having a first cable port that extends outward from the housing and a second cable port that extends into the housing. A cable is inserted through the first and second cable ports. A first cold shrink tubing is applied over the first cable port and a portion of the cable that extends outward from the housing. A second cold shrink tubing is applied over the second cable port and a portion of the cable that extends into the housing.

Another aspect of the invention is a device for securing a cable to a housing. The device has first and second cable ports aligned with each other. The device has a mounting flange positioned between the first and second cable ports. The mounting flange is capable of being mounted to a housing, so that the first cable port extends outwardly from the housing, and the second cable port extends into the housing.

Another aspect of the invention is an assembly including a housing having an opening therethrough. The housing has first and second cable ports aligned with the opening and aligned with each other. The first cable port extends outwardly from the housing, and the second cable port extending into the housing. A cable passes through the first and second cable ports. A first cold shrink tubing is placed over the first cable port and a portion of the cable that extends outward from the housing. A second cold shrink tubing is placed over the second cable port and a portion of the cable that extends into the housing.

BRIEF DESCRIPTION OF THE DRAWINGS

FIG. 3 shows a conventional joint connecting a cable to a BEP using the cable port of FIG. 1, and cold shrink tubing.

FIG. 6 is a cross-sectional view of a first exemplary joint according to the present invention, connecting a cable to a BEP, using the cable port device of FIG. 4 and a pair of cold shrink tubings.

DETAILED DESCRIPTION

Figure 2:
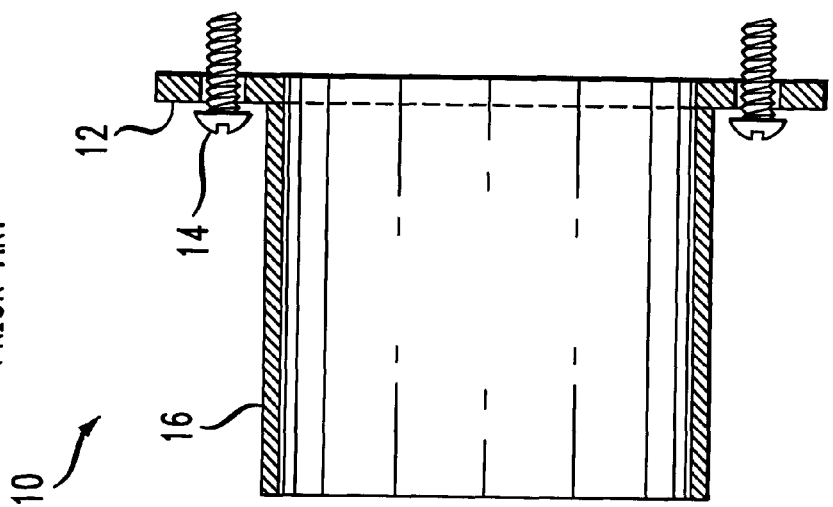
FIG. 2 is a cross-sectional view of the conventional cable port shown in FIG. 1, taken along section line 2—2 of FIG. 1.
Figure 1:
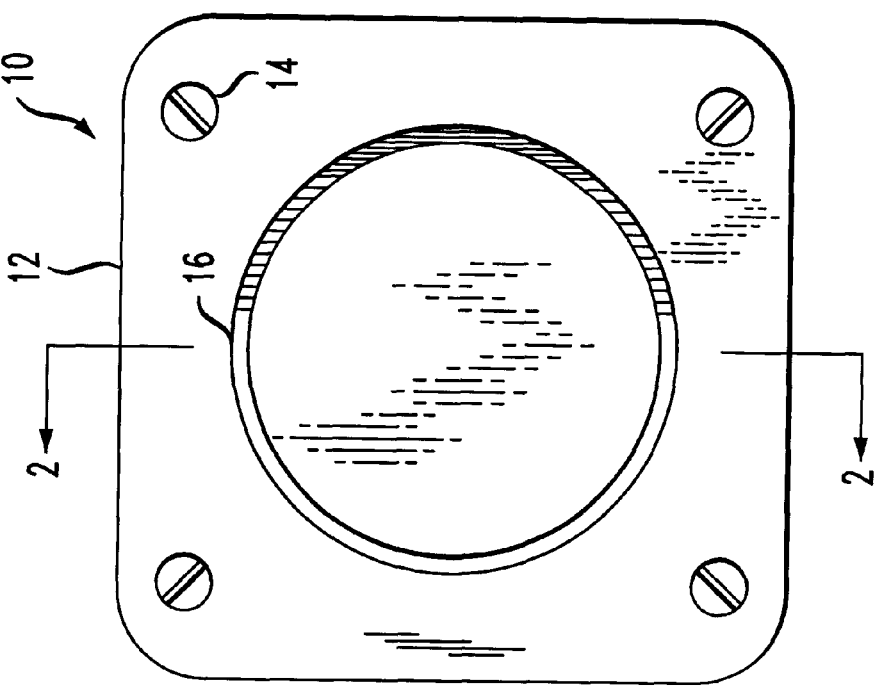
FIG. 1 is a plan view of a conventional cable port.
Figure 5:
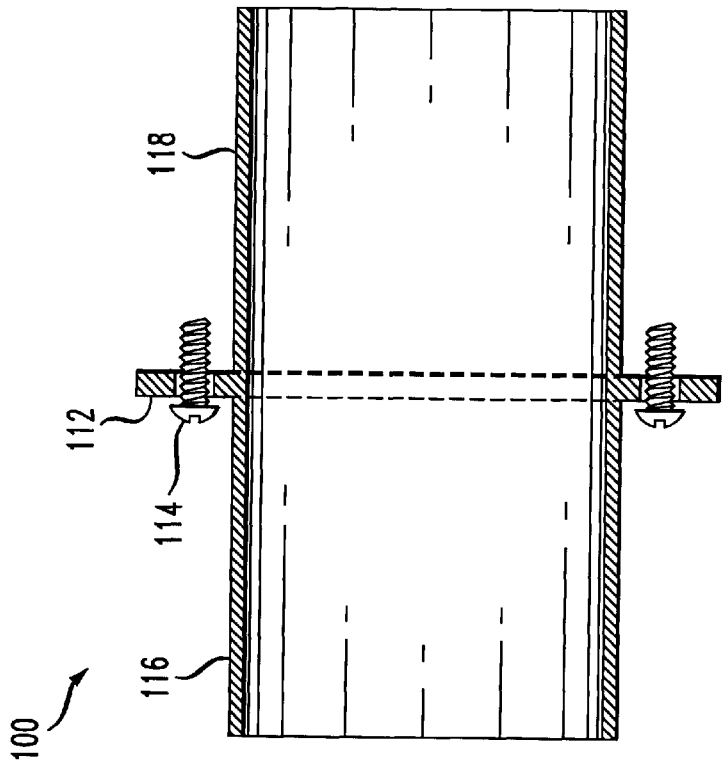
FIG. 5 is a cross-sectional view of the cable port shown in FIG. 4, taken along section line 5—5 of FIG. 4.
Figure 4:
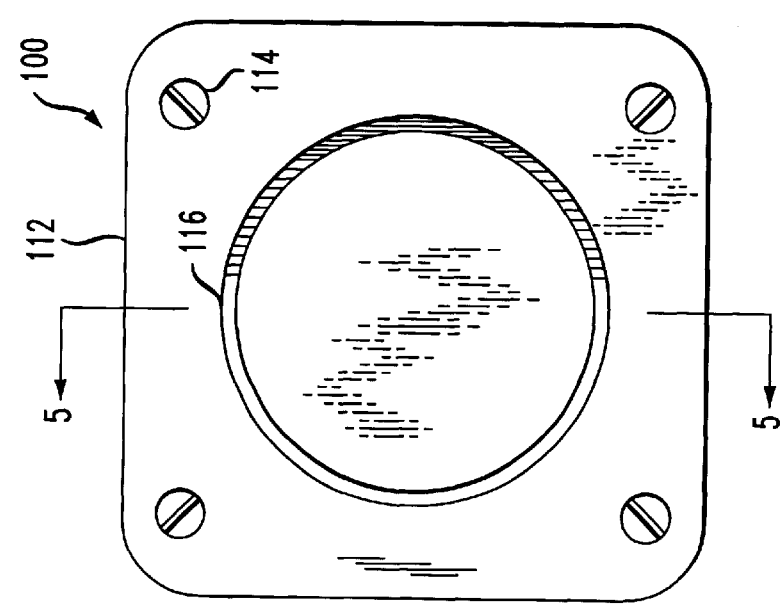
FIG. 4 is a plan view of a cable port device according to the present invention.

FIGS. 4–6 show a first exemplary embodiment of the present invention. FIGS. 4 and 5 show a cable port device 100 according to one aspect of the invention. As shown in FIG. 6, the device 100 may be used for securing a cable 150 to a housing 130.

The device 100 has a first cable port 116 and a second cable port 118. Cable ports 116 and 118 are aligned with each other. The device 100 has a mounting flange 112 positioned between the first and second cable ports 116 and 118. The mounting flange 112 is capable of being mounted to a housing 130, so that the first cable port 116 extends outwardly from the housing 130, and the second cable port 118 extends into the housing 130.

In the exemplary device 100, the first and second cable ports 116 and 118 form a continuous tube. The outer wall of the exemplary cable ports 116 and 118 is smooth. The outer wall may also be varied by adding features to the outer surface of the cable ports 116 and 118, such as circumferential grooves or lands or the like.

The device 100 may be formed from any suitable rigid material, such as plastic or metal. Exemplary suitable polymer materials include polycarbonate and polyvinyl chloride.

FIG. 6 shows an exemplary method for connecting a cable 150 to a housing such as BEP housing 130, using a pair of cold shrink tubings 140 and 142 to form a high pressure seal. The housing 130 has a first cable port 116 that extends outward from the housing and a second cable port 118 that extends into the housing. A cable 150 is inserted through the first and second cable ports 116 and 118. A first cold shrink tubing 140 is applied over the first cable port 116 and a portion of the cable 150 that extends outward from the housing 130. A second cold shrink tubing 142 is applied over the second cable port 118 and a portion of the cable 150 that extends into the housing 130.

In an exemplary sequence for performing the method, the cable port device 100 (including the first and second cable ports 116 and 118) is mounted onto the housing 130 using conventional fasteners 114. The tubings 140 and 142 may be placed on the cable ports 116 and 118 next, and then the cable 150 is inserted through the tubing and through the cable ports. After the cable 150 is inserted through the cable ports 116 and 118, the core (not shown) of each cold shrink tubing 140, 142 is removed, causing tubing 140 to collapse and grip the cable port 116 and the cable 150, and causing tubing 142 to collapse and grip the cable port 118 and the cable 150.

The resulting assembly of FIG. 6 has a housing 130 having an opening therethrough. The housing 130 has first and second cable ports 116 and 118 aligned with the opening and aligned with each other. The first and second cable ports 116 and 118 are included in a single device 100 that has a mounting flange 112 for mounting the device to the housing 130. The first cable port 116 extends outwardly from the housing 130, and the second cable port 118 extends into the housing 130. A cable 150 passes through the first and second cable ports 116 and 118. The first cold shrink tubing 140 is positioned over the first cable port 116 and a portion of the cable 150 that extends outward from the housing 130. The second cold shrink tubing 142 is positioned over the second cable port 118 and a portion of the cable 150 that extends into the housing 130.

The assembly of FIG. 6 provides a seal that is suitable for typical pressurized cable enclosures, and can withstand either an internal or external pressure load of at least 10 psi. In particular, in contrast to prior art cold shrink tubing seals, if the internal pressure in BEP 130 increases, that internal pressure is applied on cold shrink tubing 142, increasing the grip between tubing 142 and the cable 150. Thus, by adding a second cold shrink tubing 142 internal to the housing 130, a seal is formed that is effective when the housing 130 has a pressure substantially higher than the pressure outside the housing.

Conversely, if the pressure outside of the housing exceeds the pressure inside the housing, cold shrink tubing 140 is compressed to more tightly grip the cable 150 and is thus able to withstand the pressure without leakage.

Thus, an enclosure using a sealing method and structure according to the present invention offers greater versatility because if may be used in a greater variety of environments than housings having conventional cold shrink tubing joints. An enclosure using the exemplary joint may be placed underwater or buried in the ground, without compromising the integrity of the equipment in the housing.

Further, in comparison to the heat shrink tubing methods used in conventional pressurized housings, the exemplary method can be used much more quickly. The cold shrink tubings 140, 142 are collapsed around the cable ports 116, 118 and cable 150 by merely pulling the core (not shown) out of the tubing, which can be done in seconds. In comparison, each heat shrink tubing joint could require up to 20 minutes of time and labor. Thus, the present invention increases productivity substantially.

As shown in the embodiment of FIGS. 4–6, the first cable port 116 and second cable port 118 are integrally formed from a single piece of material. Other variations are also contemplated, as described below.

Figure 7:
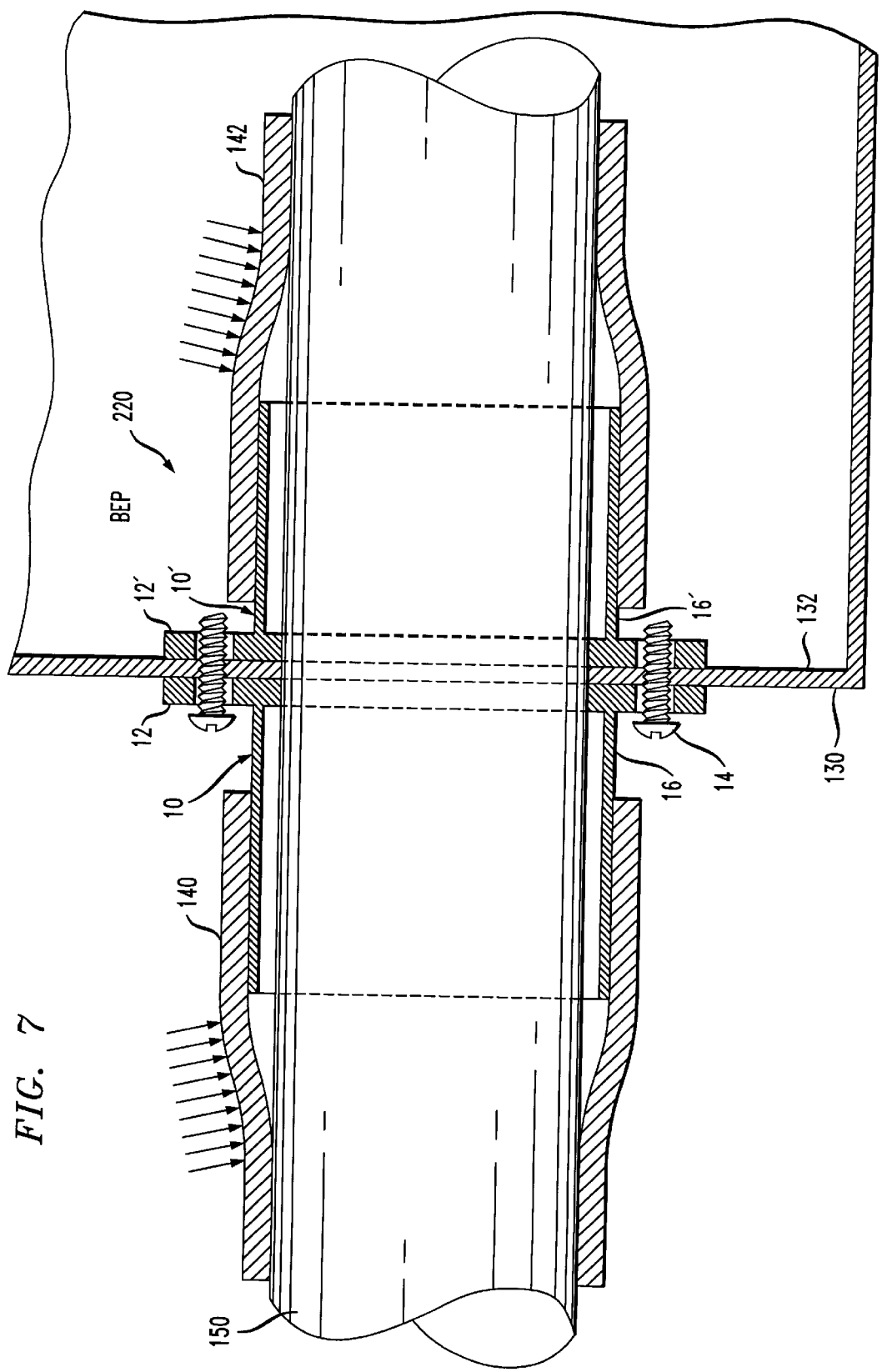
FIG. 7 is a cross-sectional view of a second exemplary joint according to the present invention, connecting a cable to a BEP, using two of the cable ports of FIG. 1 and a pair of cold shrink tubings.

FIG. 7 shows a second exemplary method of forming a high pressure seal with cold shrink tubing. FIG. 7 allows using of conventional cable ports 10 and 10' in a new combination including a double-sealed joint 220. In FIG. 7, the first and second cable ports 10 and 10' are separate and distinct from each other. The step of providing the housing 130 having two cable ports 10 includes: aligning the first and second cable ports 10 with each other and with an opening in the housing 130; and fastening the first and second cable ports to the housing. If cable port 10' has reduced-size mounting holes as shown in FIG. 7, the fastening step may include driving a fastener 14 through the flange 12' of cable port 10'. Alternatively, flanges 12 and 12' may both have through holes, in a which case a nut (not shown) may hold the fastener 14 in place. Although the exemplary fastener 14 is a screw, other conventional fasteners may be used. Optionally, a conventional sealing gasket (not shown) may be placed between each flange 12, 12' and the wall 132 of the BEP 130.

Figure 8:
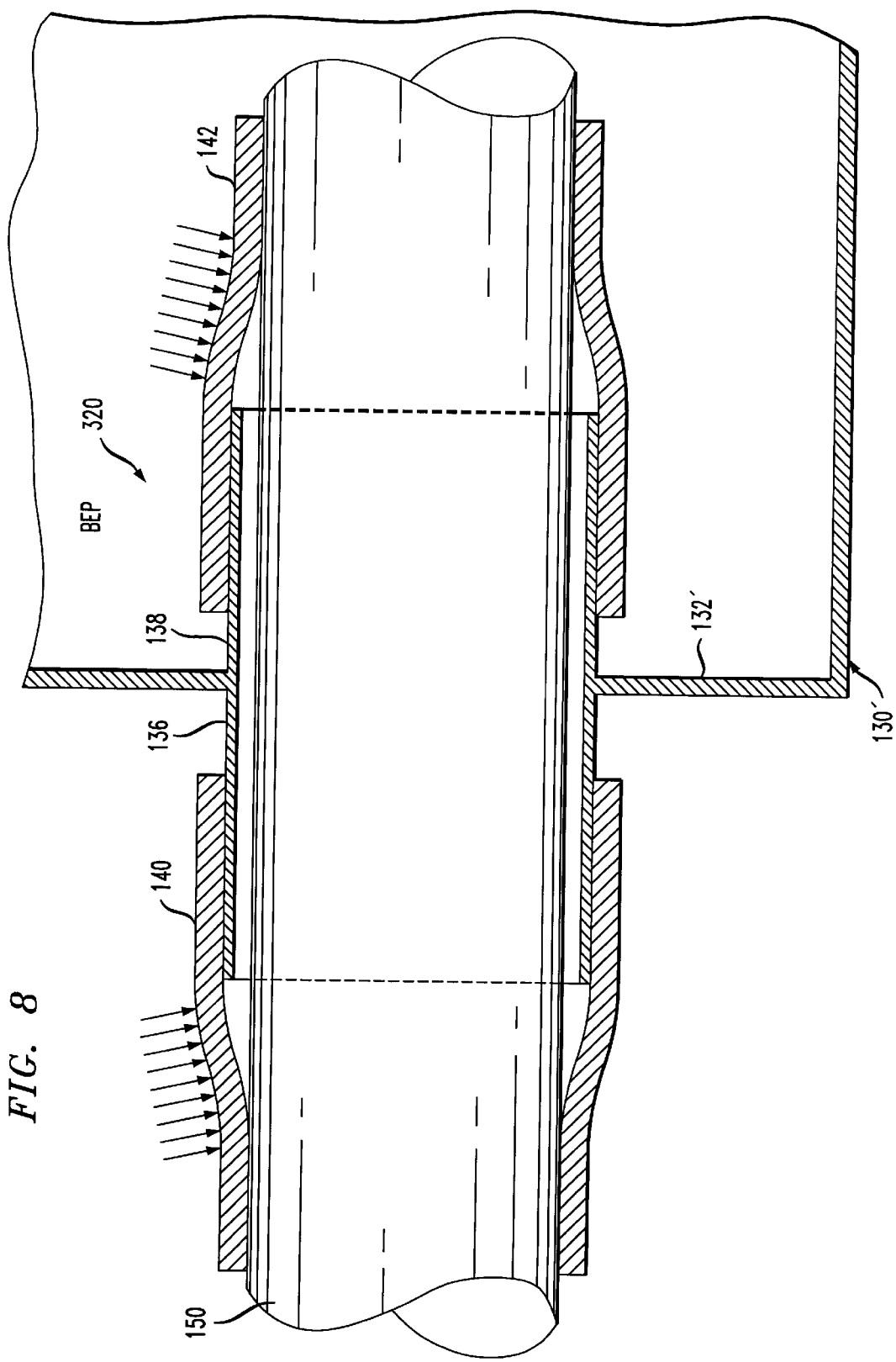
FIG. 8 is a cross-sectional view of a third exemplary joint according to the present invention, connecting a cable to a BEP using a pair of cold shrink tubings, wherein the pair of cable ports are integrally formed as a part of the housing of the BEP.

FIG. 8 shows a third exemplary embodiment of the invention, wherein the first cable port 136 and second cable port 138 are integrally formed as a part of the housing 130'.

A housing 130' as shown may be molded, cast or brazed to include the two cable ports 136 and 138 as part of a unitary housing end cap 132'. Using the housing 130', the separate step of mounting the cable ports onto the housing (as performed for the embodiments of FIGS. 6 and 7) is not performed. Since the cable ports 136 and 138 are integrally attached without a mounting flange, there is no possibility of any leakage between the end cap 132' and any mounting flanges.

Although the exemplary housing 130 is a building entrance protector housing, the invention may be practiced using a pair of opposed cable ports to secure a cable to other types of housings, to form a high pressure seal. Although the exemplary cable 150 has an optical fiber therein, the invention may be used to secure other types of cables to a housing. Although the invention is advantageous for housings subjected to high pressure, it may also be used for securing a cable to a housing that is not pressurized.

Although the invention has been described in terms of exemplary embodiments, it is not limited thereto. Rather, the appended claim should be construed broadly, to include other variants and embodiments of the invention which may be made by those skilled in the art without departing from the scope and range of equivalents of the invention.

What is claimed is:

1. A method for connecting a cable to a housing, comprising the steps of:

providing a housing having a first cable port that extends outward from the housing and a second cable port that extends into the housing;

inserting a cable through the first and second cable ports;

applying a first cold shrink tubing over the first cable port and a portion of the cable that extends outward from the housing; and applying a second cold shrink tubing over the second cable port and a portion of the cable that extends into the housing.

2. The method of claim 1, wherein the first and second cable ports are integrally formed from a single piece of material.

3. The method of claim 2, wherein the step of providing the housing includes fastening a device to the housing, the device including the first and second cable ports.

4. The method of claim 1, wherein the first and second cable ports are separate and distinct from each other, and the step of providing the housing includes:

aligning the first and second cable ports with each other and with an opening in the housing; and fastening the first and second cable ports to the housing.

5. The method of claim 1, further comprising the step of pressurizing the housing after applying the first and second cold shrink tubing.

6. An assembly comprising:

a housing;

a device having an opening therethrough, a mounting flange mounting the device to the housing and first and second cable ports aligned with the opening and aligned with each other, the first cable port extending outwardly from the housing, and the second cable port extending into the housing;

a cable passing through the first and second cable ports;

a first cold shrink tubing placed over the first cable port and a portion of the cable that extends outward from the housing; and a second cold shrink tubing placed over the second cable port and a portion of the cable that extends into the housing.

7. An assembly comprising:

a housing having an opening therethrough, the housing having first and second cable ports aligned with the opening and aligned with each other, the first cable port extending outwardly from the housing, and the second cable port extending into the housing;

a cable passing through the first and second cable ports;

a first cold shrink tubing placed over the first cable port and a portion of the cable that extends outward from the housing; and a second cold shrink tubing placed over the second cable port and a portion of the cable that extends into the housing.

8. The assembly of claim 7, wherein the first and second cable ports are integrally formed from a single piece of material.

9. The assembly of claim 8, wherein the first and second cable ports are included in a device that has a mounting flange for mounting the first and second cable ports to the housing.

10. The assembly of claim 7, wherein the first and second cable ports are separate and distinct from each other and from the housing, and each of the first and second cable ports has a respective mounting flange for fastening the first and second cable ports to the housing.

11. The assembly of claim 7, wherein the first and second cable ports are integrally formed as a part of the housing.

12. The assembly of claim 7, wherein the housing is a building entrance protector housing.

13. The assembly of claim 7, wherein the cable has an optical fiber therein.

14. The assembly of claim 7, wherein the housing has a pressure which is greater than a pressure outside of the housing.

* * * * *